PISTON ASSEMBLY FOR PUMP
Original Filed Sept. 28, 1967 3 Sheets-Sheet 1
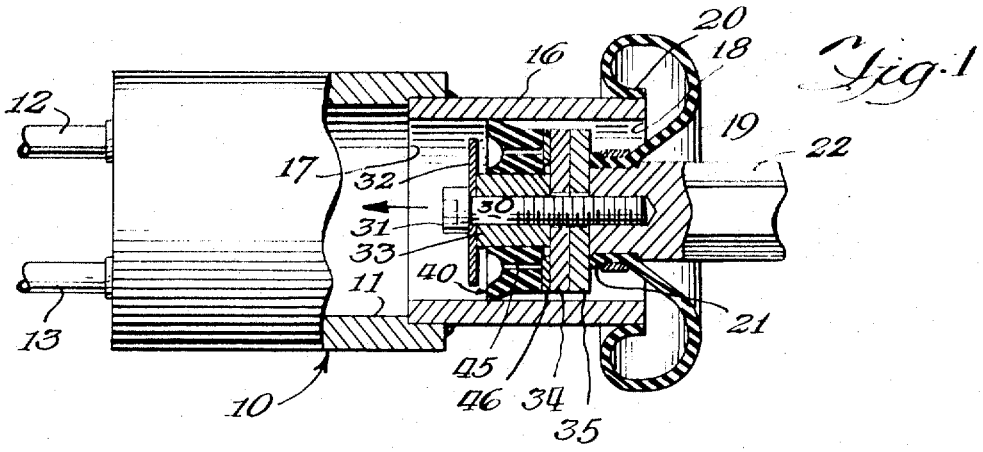
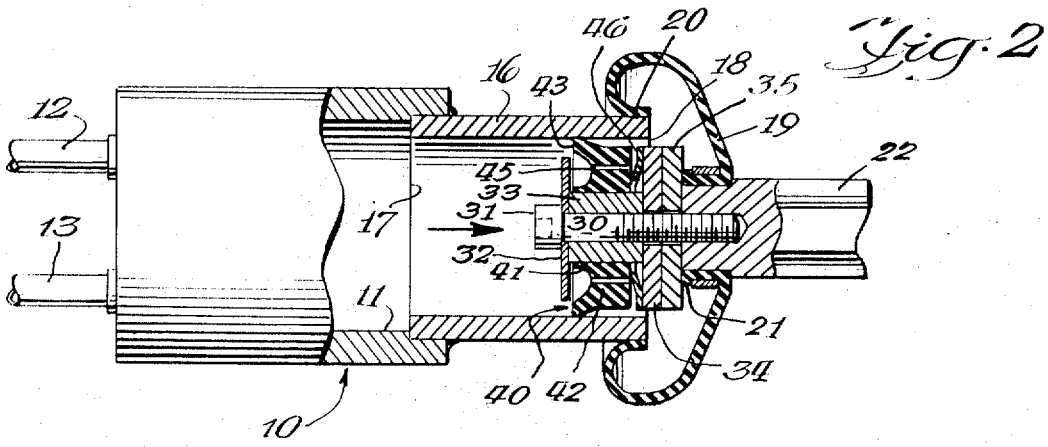
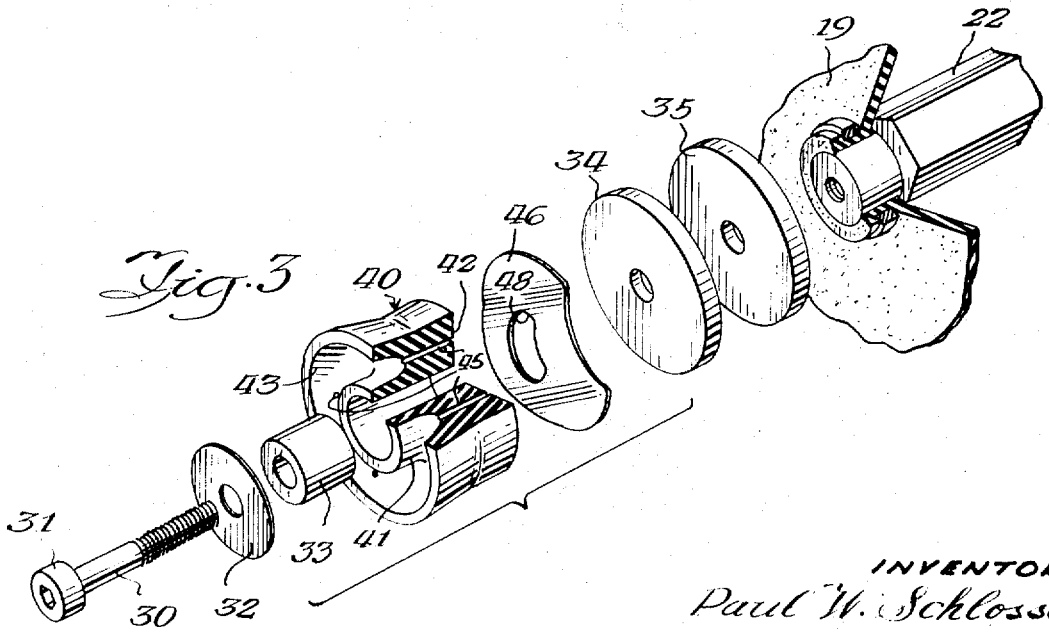
INVENTOR
Paul W. Schlosser
BY Merriam, Marshall, Shapiro & Klose
ATTORNEYS

PISTON ASSEMBLY FOR PUMP

Original Filed Sept. 28, 1967 3 Sheets-Sheet 2

INVENTOR
Paul W. Schlosser
BY Merriam, Marshall, Shapiro & Klose
ATTORNEYS

PISTON ASSEMBLY FOR PUMP
Original Filed Sept. 28, 1967 3 Sheets-Sheet 3
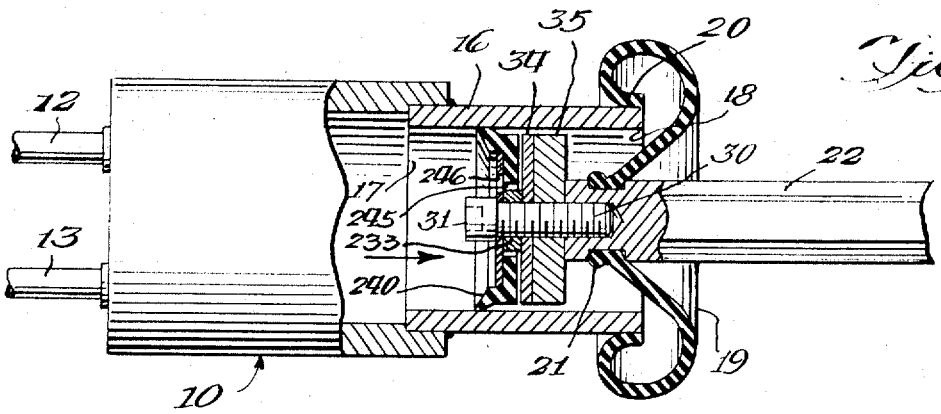
Fig. 7
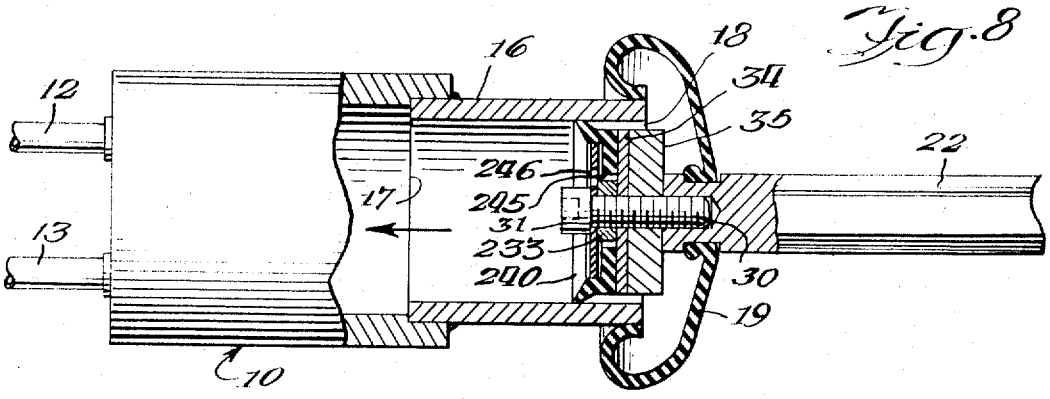
Fig. 8
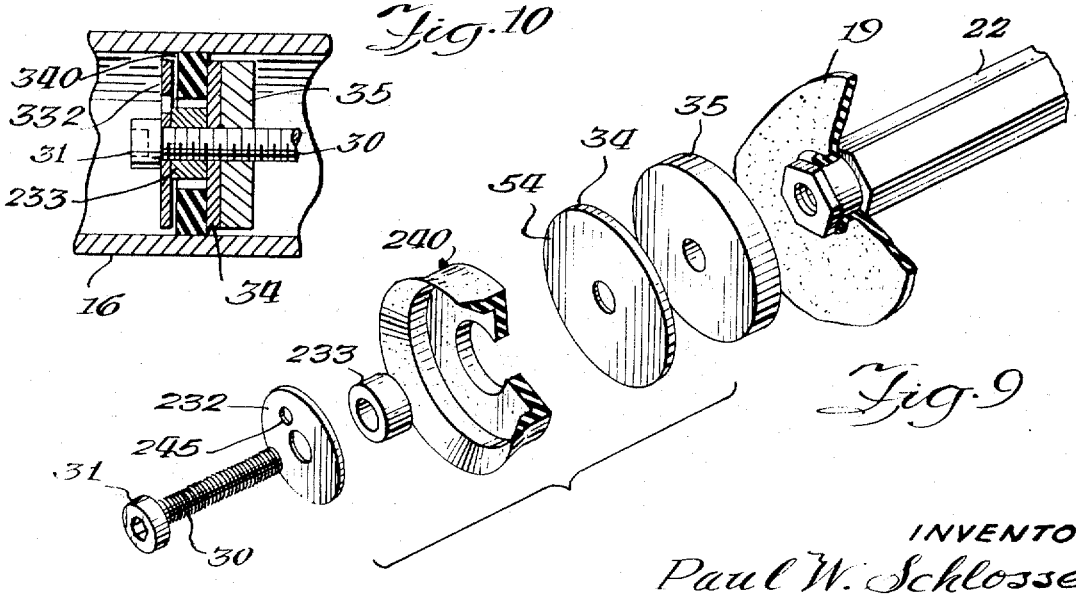
Fig. 10
Fig. 9
INVENTOR
Paul W. Schlosser
BY Wyman, Marshall, Shapiro & Klein
ATTORNEYS United States Patent Office Re. 27,382
Reissued May 30, 1972

27,382

PISTON ASSEMBLY FOR PUMP

Paul W. Schlosser, 4452 N. Avers Ave.,
Chicago, Ill. 60625

Original No. 3,391,646, dated July 9, 1968, Ser. No. 671,368, Sept. 28, 1967, which is a continuation-in-part of Ser. No. 590,429, Oct. 28, 1966. Application for reissue Dec. 4, 1969, Ser. No. 881,962
Int. Cl. F04b *21/00, 39/00;* F16j *15/50;* F01b *31/00*
U.S. Cl. 417—439 12 Claims

Matter enclosed in heavy brackets [ ] appears in the original patent but forms no part of this reissue specification; matter printed in italics indicates the additions made by reissue.

ABSTRACT OF THE DISCLOSURE

A piston, reciprocating in the cylinder of a piston pump, has an annular seal around its periphery with a fluid venting passage communicating opposite sides of the seal to equalize pressure on opposite sides of the seal during a suction stroke of the piston. Disc-shaped sealing means are located behind the seal for closing the venting passage during the pressure stroke of the piston.

Cross-reference to related application

This is a continuation-in-part of application Ser. No. 590,429, filed Oct. 28, 1966, and entitled, "Pump With Piston and Diaphragm."

Field of the invention

The present invention relates generally to piston pumps, and more particularly to a piston assembly thereof having structure which prevents leakage of liquid from the front side to the back side of the piston during cyclic operation of the piston.

Description of the prior art

A piston pump includes a cylinder having an inner open end communicating with a pump compartment and an outer end which is sealed from the atmosphere. A piston reciprocates within the cylinder, in a cycle including pressure and suction strokes. The piston includes a cylindrical plug around the periphery of which is located an annular seal composed of elastic material such as rubber.

During a suction stroke of the piston, the pressure within the cylinder at the inner side of the piston is less than the pressure at the outer side of the piston. This difference in pressure tends to elastically distort or deform the elastic seal toward the inward end of the cylinder, around the cylindrical piston plug, and the distortion is most acute at the outer periphery of the elastic seal. On the succeeding pressure stroke, the elastic seal returns to its undistorted condition, but before it has completely recovered from its distorted condition, there is a likelihood that liquid, within the pump compartment communicating with the cylinder, will work its way from in front of the piston around the outer periphery of the seal and get behind the piston, which is undesirable.

Summary of the invention

The present invention provides a fluid venting passage communicating opposite sides of the annular seal, to equalize the pressure on the inner and outer sides of the piston, during the suction stroke of the piston, to thereby prevent elastic deformation and distortion of the elastic annular seal during the suction stroke. This, in turn, eliminates the likelihood of any liquid from the pump compartment working its way around the outer periphery of the seal during the pressure stroke of the piston. Means are also provided to seal the venting means during the pressure stroke.

Other features and advantages are inherent in the structure claimed and disclosed or will become apparent to those skilled in the art from the following detailed description in conjunction with the accompanying diagrammatic drawings.

Brief description of the drawings

FIGURE 1 is a side elevational view, partially in section and partially cut away, illustrating an embodiment of a piston assembly constructed in accordance with the present invention, with the piston assembly moving in a pressure stroke;

FIGURE 2 is a view similar to FIGURE 1 with the piston assembly moving in a suction stroke;

FIGURE 3 is an exploded perspective view of the embodiment of FIGURES 1–2;

FIGURE 7 is a view similar to FIGURE 1, showing a further embodiment, with the piston assembly moving in a suction stroke;

FIGURE 8 is a view similar to FIGURE 7, with the piston assembly moving in a pressure stroke;

FIGURE 9 is an exploded perspective view of the piston assembly of FIGURES 7–8; and FIGURE 10 is a fragmentary view, similar to FIGURE 7, illustrating a modification of the embodiment of FIGURES 7–10.

Description of the preferred embodiments

Figure 4:
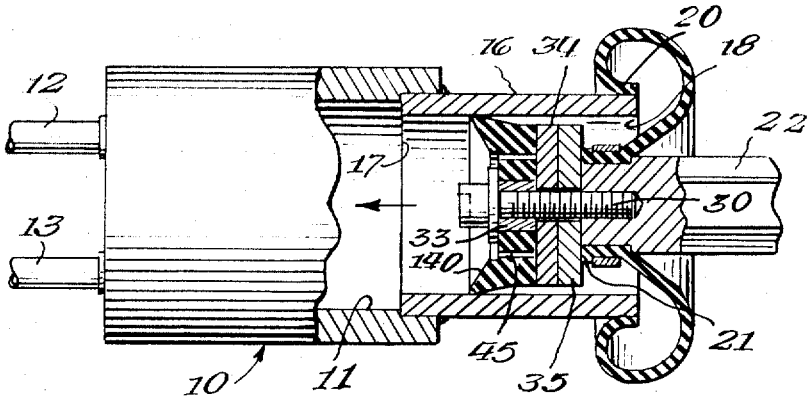
FIGURE 4 is a view similar to FIGURE 1 showing another embodiment of a piston assembly constructed in accordance with the present invention and with the piston assembly moving in a pressure stroke.

Referring initially to FIGURES 1 and 2, there is shown a pump indicated generally at 10 and comprising a compartment 11 into which liquid being pumped is received through an inlet line 12 and out of which the liquid is expelled through an outlet line 13. Communicating with compartment 11 is the inner open end 17 of cylinder 16 having an outer end 18 closed by a boot seal 19 having an outer rim 20 secured to the outside of cylinder 16 and an inner rim 21 secured around the inner end of a piston rod 22.

A piston assembly, illustrated in exploded perspective in FIGURE 3, is attached to piston rod 22 by a bolt 30 having a head 31. Mounted on bolt 30 are a disc shaped piston front plate 32, a cylindrical plug 33 and a pair of back-up washers 34, 35. Mounted around the outer periphery of cylindrical plug 33 are a cup seal indicated generally at 40 and an annular disc 46 composed of springable material. Disc 46 is normally urged to the sprung condition illustrated in FIGURES 2 and 3.

Cup seal 40 is composed of elastic material, such as rubber; and it has an inner circular flange 41, a web 42 and an outer circular flange 43 which normally wipes the inner surface of cylinder 16. Extending through the web 42 of cup seal 40 are vent holes or fluid-passage means 45, communicating the front or inner side of cup seal 40 with the back or outer side of cup seal 40.

FIGURE 2 illustrates a suction stroke of the piston assembly. In the absence of holes 45 in web 42 or cup seal 40, the following would happen during the suction stroke of the piston assembly. The fluid pressure on the inner side of the piston assembly (to the left in FIGURE 2) would be less than the pressure on the outer side (to the right in FIGURE 2). This would cause elastic cup seal 40 to be elastically deformed or distorted inwardly (to the left) relative to cylindrical plug 33; and the distortion would be most acute at outer circular flange 43 of the cup seal. When the cup seal is thus distorted, and the piston assembly moves on a pressure stroke (illustrated in FIGURE 1), in the absence of holes 45, there would be a tendency for liquid within compartment 11 to work its way around the outer periphery of cup seal 40 before the cup seal has returned to its undistorted, undeformed condition.

The provision of holes 45 permits air to pass through holes 45 from the outer side to the inner side of cup seal 40 during the suction stroke of the piston assembly thus equalizing the pressure on both sides of the cup seal and preventing distortion and deformation of the cup seal, as would occur in the absence of holes 45.

Annular disc 46, slidably mounted on plug 33, is provided to seal holes 45 during a pressure stroke (FIGURE 1) of the piston assembly, the annular disc being compressed or sandwiched between cup seal 40 and back-up washer 34. The cup seal is forced back against annular disc 46 during a pressure stroke.

During a suction stroke of the piston assembly, the springable nature of annular disc 46 causes it to return to the normally sprung condition, shown in FIGURE 2, in which condition the annular disc does not close holes 45. In other words, the springable nature of disc 46 pushes cup seal 40 and holes 45 away from the disc during a suction stroke of the piston assembly.

It is important that the annular disc 46 be composed of springable material normally urging the disc to the sprung condition, illustrated in FIGURE 2, during the suction stroke of the piston. If disc 46 was flat or unsprung during a suction stroke of the piston assembly, the disc would be sucked against holes 45, thus closing them and preventing the passage of air from the back or outer side of the piston assembly to the front or inner side thereof.

Annular disc 46 has an inner circular edge 48, having a diameter greater than the outside diameter of cylindrical plug 33. Accordingly, inner circular edge 48 and the outside surface of plug 33 define an annular space therebetween.

During the pressure stroke of the piston assembly (FIGURE 1), the pressure exerted against cup seal 40 is sufficient to urge it to extrude into whatever space is available behind it. In the absence of the annular space, defined by inner circular edge 48 of annular disc 46 and the outside surface of plug 33, the cup seal would extrude into the space between the inner surface of cylinder 16 and the outer circumferential surface of back-up washers 34, 35. By providing an annular space between disc 46 and plug 33, such extrusion, as has a tendency to occur, would be into this annular space, rather than between cylinder 16 and the back-up washers 34, 35. Extrusion of the latter type is undesirable because it causes excess wear on the cup seal, a defect not occurring when the cup seal is caused to extrude into the annular space between disc 46 and plug 33.

Figure 5:
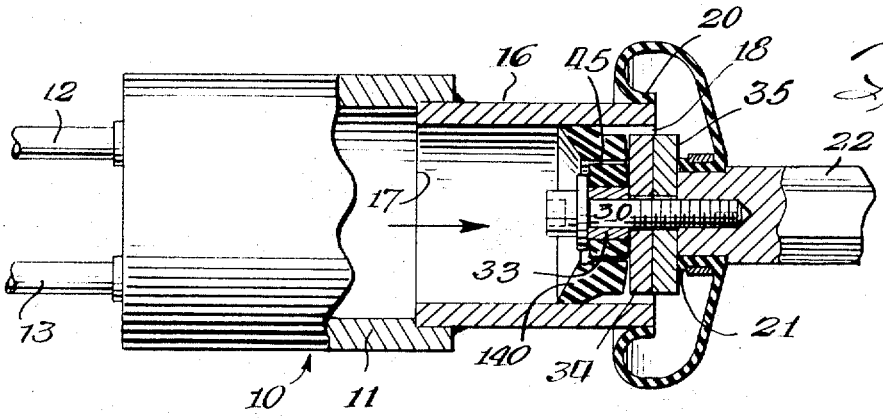
FIGURE 5 is a view similar to FIGURE 4, showing the piston assembly of FIGURE 4 in a suction stroke.
Figure 6:
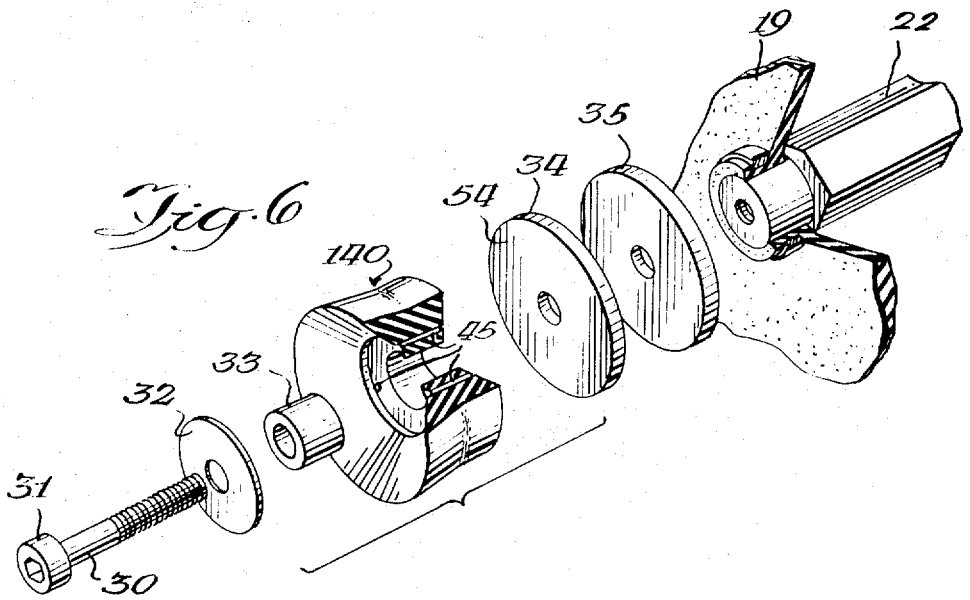
FIGURE 6 is an exploded perspective view of the piston assembly of FIGURES 4–5.

The embodiment of FIGURES 4–6 differs from the embodiment of FIGURES 1–3 in that the annular disc 46 is eliminated and the cup seal, indicated generally at 140, has larger dimensions to increase the resistance thereof to extrusion on a pressure stroke of the piston.

On a pressure stroke of the piston assembly of FIGURES 4–6, the fluid-passage holes 45 are closed by the front surface 54 of back-up washer 34. During a suction stroke (illustrated in FIGURE 5), initially, cup seal 140 is deformed slightly inwardly and away from front surface 54 of back-up washer 34. This deformation continues until the back ends of fluid passages 45 are pulled away from front surface 54 of back-up washer 34, thus permitting air to pass from the outer or back side of cup seal 140 through the fluid passages 45 to the inner or front side of the cup seal, thus equalizing the pressure on opposite sides of cup seal 140, and eliminating the conditions which would increase the cup seal's distortion beyond that necessary to open fluid passages 45 to the passage of air therethrough.

The engagement of front surface 54 of washer 34 with the back surface of plug 33, prevents washer 34 from being sucked forwardly to seal holes 45 during a suction stroke of the piston (FIGURE 5).

Although no annular space is provided around cylindrical plug 33, cup seal 140 has dimensions of sufficient magnitude to resist extrusion, during the pressure stroke of the piston, into the space between cylinder 16 and back-up washers 34, 35.

In the embodiment of FIGURES 7–9, there are no holes through the annular seal 240 except for the central opening therethrough; and the inner diameter of seal 240 is sufficiently larger than the outside diameter of the cylindrical plug 233 to loosely mount the seal on the plug and to define therebetween an annular space 245 communicating with an opening 246 in front plate 232 engaging the front end of plug 233. Opening 246 and annular space 245 define the fluid-passage for the embodiment of FIGURES 7–9.

Cylindrical plug 233 is slightly thicker in an axial direction than is annular seal 240. For example, seal 240 could be about one-eight inch thick, and plug 233 could be 0.015 inch thicker. The loose fit of seal 240 on plug 233 mounts the seal for reciprocal movement axially along plug 233 between a rearward position (FIG. 8) on a pressure stroke and a forward position (FIG. 7) on a suction stroke.

Forward movement of seal 240 on a suction stroke is limited by front plate 232; and rearward movement on a pressure stroke is limited by back-up washer 34 having a front surface 54 closing the back end of annular space 245 to prevent fluid-passage therethrough on a pressure stroke.

In the modification of FIGURE 10, the annular seal 340 is disc-shaped rather than cup-shaped as in FIGURES 7–9. The seal 340 has the same outside diameter at any axial location on the seal.

The elastic seals, both of FIGURES 7–9 and of FIGURE 10, have dimensions of sufficient magnitude to resist extrusion rearwardly between the outer periphery of back-up washer 34 and the inner surface of cylinder 16, during a pressure stroke.

The foregoing detailed description has been given for clearness of understanding only, and no unnecessary limitations should be understood therefrom, as modifications will be obvious to those skilled in the art.

What is claimed is:

1. In combination with a pump having:

hollow cylinder means with an inner open end and an outer end behind said inner open end;

means sealing said outer end of said cylinder means;

piston means mounted for reciprocal movement within the cylinder means in a cycle including suction and pressure strokes;

said piston means comprising a cylindrical plug having an outer diameter less than the inner diameter of the cylinder means;

said piston means including an annular seal mounted on said plug and having an outer periphery for wiping the interior of said cylinder means;

[said seal facing said chamber;]

said piston means including a rigid backing member mounted behind said plug to restrict rearward movement of the annular seal on the plug during a pressure stroke of the piston means;

[and] a chamber, for holding liquid, communicating with the inner open end of said cylinder means;

*said seal facing said chamber;*

*and inlet means for introducing liquid into said chamber, in front of said piston means, on a suction stroke of the piston;* the additional features comprising fluid-passage means communicating opposite sides of said annular seal for equalizing the pressure on said opposite sides of the annular seal during a suction stroke of the piston means so as to prevent the outer periphery of the annular seal from distorting inwardly during said suction stroke;

said fluid-passage means comprising means extending through said seal [.]*;*

*and means, including said annular seal, for preventing liquid from entering said cylinder behind said piston means on a pressure stroke of the piston means.*

2. In the combination of claim 1, the further feature comprising:

fluid-passage closure means for preventing liquid [in said chamber] *introduced into said pump at said inlet means* from entering the space between the annular seal and the seal on the outer end of the cylinder means, during a pressure stroke of the piston means.

3. In the combination of claim 2 wherein:

said annular seal is a cup seal having an inner circular flange mounted on said plug, an outer circular flange for wiping the interior of said cylinder means, and a web between said flanges;

and said fluid-passage means comprises holes extending through the web of the cup seal.

4. In the combination of claim 3 wherein:

said fluid-passage closure means comprises means for closing said holes in the web of the cup seal in response to a pressure stroke of the piston means and for maintaining the holes in an open condition during a suction stroke of the piston means.

5. In the combination of claim 4 wherein said fluid-passage closure means comprises:

an annular disc monuted around said plug, between the cup seal and said rigid backing member, and in facing relation with the holes in the web of the cup seal;

said disc being composed of springable material normally urging said disc away from said holes during a suction stroke of the piston means.

6. In the combination of claim 5 wherein:

said annular disc has an inner diameter greater than the external diameter of said cylindrical plug, whereby the plug and the annular disc define an annular space therebetween.

7. In the combination of claim 2 wherein said fluid-passage closure means comprises:

surface means on said rigid backing member, disposed in facing relation to said fluid passage means and to the rear surface of said annular seal, and engageable with the rear surface of said annular seal and with one end of said fluid-passage means in response to a pressure stroke of the piston means.

8. In the combination of claim 7 wherein:

said cylindrical plug includes means engaging said rigid backing member for restricting inward movement of the rigid backing member toward the annular seal, during a suction stroke of the piston means, to prevent the rigid backing member from sealing said fluid-passage during said suction stroke.

9. In the combination of claim 7 wherein:

said annular seal is a cup seal having an inner circular flange mounted on said plug, an outer circular flange for wiping the interior of said cylinder means, and a web between said flanges;

and the cup seal is composed of material, and has dimensions of sufficient magnitude, to impart, to the cup seal's outer flange, resistance to extrusion rearwardly between the cylinder means and the rigid backing member during a pressure stroke of the piston means.

10. In the combination of claim 2 wherein:

said piston means includes a rigid front plate located adjacent the front surface of said annular seal;

said annular seal has an inner diameter greater than the outer diameter of said cylindrical plug and said plug is thicker, in an axial direction, than said annular seal at the inner periphery thereof, whereby said annular seal is mounted for reciprocal movement axially along said plug between said front plate and said rigid backing member in response to pressure and suction strokes of said piston means;

the inner periphery of the annular seal and the outer surface of the cylindrical plug define an annular space therebetween;

and an opening in said front plate communicating with said annular space;

said opening and said annular space together defining said fluid-passage means.

11. In the combination of claim 10 wherein:

said annular seal is disc-shaped and has the same outside diameter at any axial location on the annular seal.

12. In the combination of claim 10 wherein:

said annular space constitutes the only fluid-passage through said elastic seal.

References Cited

The following references, cited by the Examiner, are of record in the patented file of this patent or the original patent.

UNITED STATES PATENTS

| | | | |
|---|---|---|---|
| 2,322,010 | 6/1943 | Fowler | 92—240 |
| 3,101,131 | 8/1963 | Bourcier de Carbon et al. | 74—18.2 |

FOREIGN PATENTS

| | | |
|---|---|---|
| 906,408 | 1/1954 | Germany. |
| 221,032 | 9/1924 | Great Britain. |
| 328,809 | 5/1930 | Great Britain. |
| 383,589 | 11/1932 | Great Britain. |
| 503,258 | 4/1939 | Great Britain. |

ROBERT M. WALKER, Primary Examiner

U.S. Cl. X.R.

74—18.2; 92—185, 240